United States Patent [19]
Yasuda

[11] Patent Number: 6,115,663
[45] Date of Patent: Sep. 5, 2000

[54] DRIVE POWER CONTROL DEVICE FOR VEHICLE

[75] Inventor: Sota Yasuda, Isehara, Japan

[73] Assignee: Nissan Motor Co., Ltd., Kanagawa, Japan

[21] Appl. No.: 08/951,761

[22] Filed: Oct. 16, 1997

[30] Foreign Application Priority Data

Oct. 16, 1996 [JP] Japan .................................. 8-273614

[51] Int. Cl.$^7$ ........................................................ G06F 7/00
[52] U.S. Cl. .................. 701/89; 701/74; 701/84; 701/90; 180/197; 180/248; 180/249
[58] Field of Search .................................. 701/72, 73, 74, 701/81, 82, 83, 84, 89, 90, 91; 180/197, 248, 249

[56] References Cited

U.S. PATENT DOCUMENTS

| | | | |
|---|---|---|---|
| 5,168,955 | 12/1992 | Naito | 180/197 |
| 5,497,333 | 3/1996 | Sasaki | 701/72 |
| 5,519,617 | 5/1996 | Hughes et al. | 180/197 |

FOREIGN PATENT DOCUMENTS

| | | |
|---|---|---|
| 2-63934 | 3/1990 | Japan . |
| 5-155264 | 6/1993 | Japan . |

*Primary Examiner*—William A. Cuchlinski, Jr.
*Assistant Examiner*—Gertrude Arthur
*Attorney, Agent, or Firm*—McDermott, Will & Emery

[57] ABSTRACT

In a four wheel drive vehicle, when rear wheels which are principal drive wheels skid, first a traction control system is operated so as to reduce the drive power to the rear wheels. Thereafter the proportion of drive power apportioned to the front wheels which are auxiliary drive wheels is increased by a torque splitting control system. By doing this, skidding of a wheel due to delay in application of traction control is prevented.

6 Claims, 2 Drawing Sheets

DRIVE POWER CONTROL DEVICE FOR VEHICLE

The contents of Tokugan Hei 8-273614, with a filing date of Oct. 16, 1996 in Japan, are hereby incorporated by reference.

FIELD OF THE INVENTION

This invention relates to application of traction control and torque splitting control to a four wheel drive vehicle.

BACKGROUND OF THE INVENTION

As a traction control system for a vehicle which prevents deterioration of acceleration performance when a wheel skids during acceleration of the vehicle or the like, Tokkai Hei 2-63934 published by the Japanese Patent Office in 1990 discloses the concept of reducing the output power of the engine along with operating the brake when skidding of a vehicle driving wheel is detected.

Moreover, Tokkai Hei 5-155264 published by the Japanese Patent Office in 1993, for example, discloses a torque splitting control system which changes the apportionment of drive power between the front wheels and the rear wheels of a four wheel drive vehicle.

Although either of these prior art proposals offers a technique for preventing drive wheel skid, the following problem arises with a four wheel drive vehicle equipped both with a traction control system and with a torque splitting control system.

When for example a wheel of the vehicle spins freely upon a road whose coefficient of friction $\mu$ is low such as a road bearing an accumulation of snow, if the torque splitting control system operates before the traction control system, then a delay time period occurs before the traction control system operates, and the wheel is not prevented from skidding to some extent during this delay time period. While this free spinning is occurring the coefficient of friction $\mu$ of the road surface becomes yet lower, and as a result the starting off capability and the acceleration performance of the vehicle deteriorate.

SUMMARY OF THE INVENTION

It is therefore an object of this invention to prevent skidding of the vehicle wheels upon a road whose coefficient of friction $\mu$ is low.

In order to achieve the above object, this invention provides a drive power control device for a four wheel drive vehicle which comprises principal drive wheels and auxiliary drive wheels. The device comprises a sensor which detects skidding of a principal drive wheel, a traction control system which reduces the drive power to the principal drive wheels, a torque splitting control system which increases the proportion of drive power apportioned to the auxiliary drive wheels, and a microprocessor programmed to start the traction control system upon detection of skidding by the sensor; and start the torque splitting control system after the slippage has been suppressed to a predetermined state after the start of the traction control system.

It is preferable that the microprocessor is further programmed to determine whether or not to start the torque splitting control system, when the skidding has been suppressed to the predetermined state.

It is further preferable that the device further comprises a sensor which detects the actual forward acceleration Xg of the vehicle, and that the microprocessor is further programmed so as to calculate a target acceleration Xgs for the vehicle, and to operate the traction control system if the acceleration Xg has dropped below the target acceleration Xgs with a predetermined value a subtracted therefrom. This value $\alpha$ is a value for determining if the vehicle has started to move.

It is also preferable that the slippage detection sensor comprises a sensor which detects the rotational speed of the principal drive wheels, a sensor which detects the rotational speed of the auxiliary drive wheels, and a microprocessor programmed to calculate a principal drive wheel slippage ratio based upon the difference in rotational speed between the principal drive wheels and the auxiliary drive wheels.

It is also preferable that the sensor which detects the acceleration Xg comprises a sensor which detects the rotational speed of the auxiliary drive wheels, and a microprocessor which is programmed to calculate the acceleration Xg based upon the change of rotational speed of the auxiliary drive wheels.

This invention also provides a drive power control device comprising a mechanism for detecting slippage of a principal drive wheel, a traction control system which reduces the drive power to the principal drive wheels, a torque splitting control system which increases the proportion of drive power apportioned to the auxiliary drive wheels, a mechanism for starting the traction control system upon detection of slippage, and a mechanism for starting the torque splitting control system after the slippage has been suppressed to a predetermined state after the start of the traction control system.

The details as well as other features and advantages of this invention are set forth in the remainder of the specification and are shown in the accompanying drawings.

DESCRIPTION OF THE PREFERRED EMBODIMENTS

Figure 1:
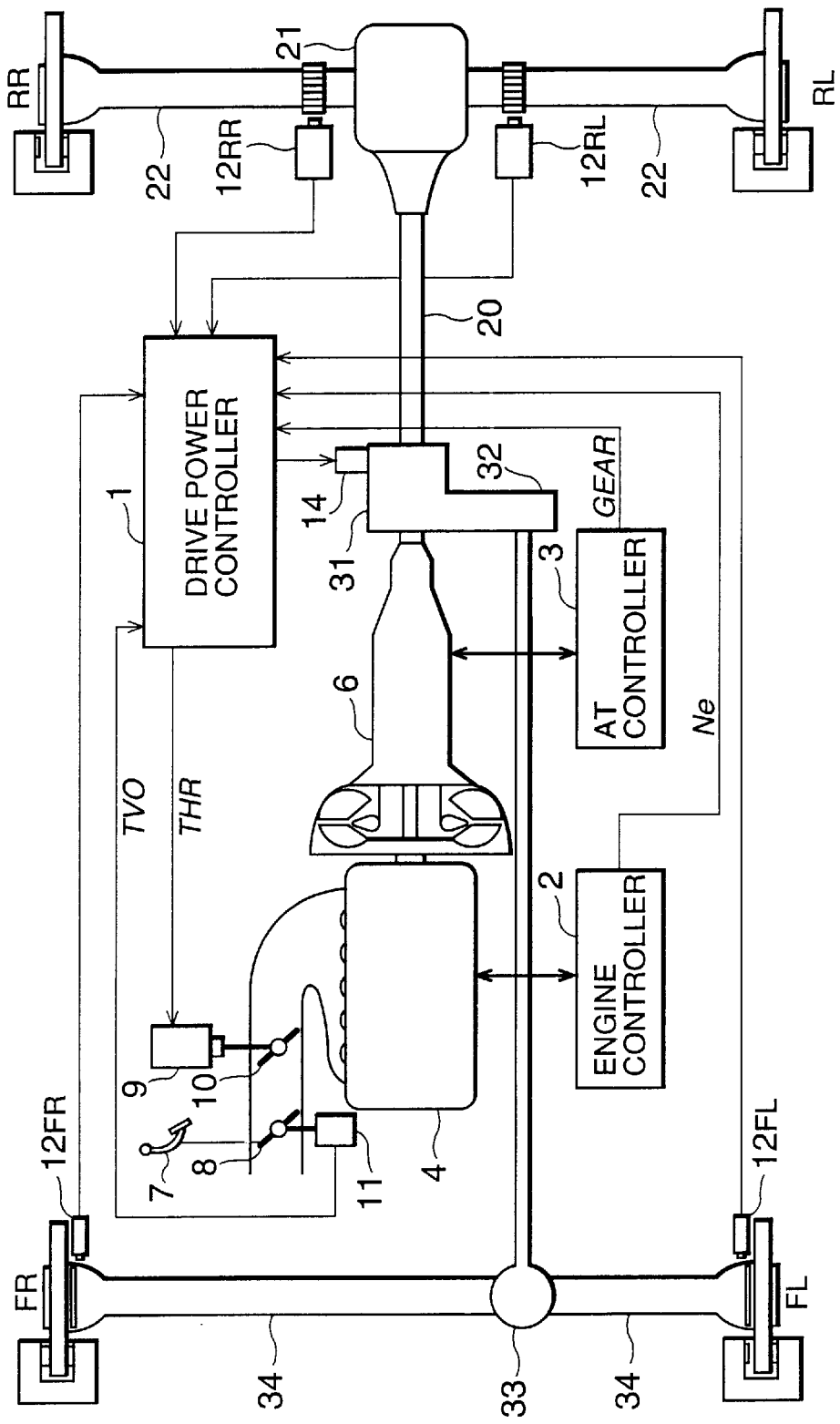
FIG. 1 is a schematic diagram of a drive power control device according to this invention.

Referring to FIG. 1 of the drawings, the drive power of an engine 4 of a four wheel drive vehicle is transmitted via a transmission 6 to a drive shaft 20, and is further input via a rear wheel differential gear assembly 21 and rear axle shafts 22 to left and right rear wheels RL and RR, which are the principal drive wheels for the vehicle.

A portion of the drive power of the engine 4 is input from the transmission 6 via the drive shaft 20, a clutch 31, a transfer gear assembly 32, a front wheel differential gear assembly 33, and front axle shafts 34 to left and right front wheels FL and FR, which are auxiliary drive wheels for the vehicle.

The clutch 31 is operated by an actuator 14 which is controlled by a drive power controller 1 which comprises a microcomputer or the like so as continuously to change the apportionment of the transmitted torque between the front wheels FL and FR and the rear wheels RL and RR from 0:100 to 50:50.

The actuator 14 operates the clutch 31 according to an output power signal from this controller 1.

Detection signals from wheel speed sensors 12FR, 12FL, 12RR, and 12RL which respectively detect the rotational speeds of the wheels FR, FL, RR, and RL are input to the drive power controller 1. The drive power controller 1 detects the forward or rearward acceleration Xgs of the vehicle, and whether or not the wheels FR, FL, RR, and RL are skidding based upon the wheels speeds VTFR, VTFL, VTRR, and VTRL.

And, if the rear wheels RR and RL are skidding, the drive power controller 1 continuously changes the apportionment of the transmitted torque between the front wheels FL and FR and the rear wheels RL and RR from 0:100 to 50:50.

The transmission 6 is set by an AT controller 3 to a gear position according to the operational state of the vehicle. The gear position GEAR which has been set by this AT controller 3 is input to the drive power controller 1.

An engine controller 2 controls the amount of fuel injection and the spark timing for the engine 4 according to the engine operational state of said engine 4. The rotational speed Ne of the engine 4 is input from the engine controller 2 to the drive power controller 1.

A first throttle valve 8 which is driven in response to an accelerator pedal 7 and a second throttle valve 10 which is opened and closed by an actuator 9 are disposed in an intake passage of the engine 4.

The output power generated by the engine 4 is increased and decreased by the drive power controller 1 opening and closing the second throttle valve 10 via the actuator 9.

Apart from this, it is possible to perform traction control by increasing and decreasing the output power generated by the engine 4 according to increase and decrease of the amount of fuel injected to the engine 4, or by increasing and decreasing the braking force which is applied to the wheels FR, FL, RR, and RL.

The opening amount TVO of the first throttle valve 8 is input to the drive controller 1 from a throttle opening sensor 11 which detects the opening amount TVO of said first throttle valve 8.

If the coefficient of friction $\mu$ of the road surface is quite low and it is detected that the rear wheels RR and RL are skidding, then, when first the torque splitting control system operates, it will be the case that until the traction control system operates the rear wheels RR and RL skid to a certain extent. Due to this skidding the road surface may be scraped or scoured somewhat, and the coefficient of friction $\mu$ of the road surface may be further reduced. As a result, there is a possibility that the starting off capability and the acceleration performance of the vehicle may yet further deteriorate.

In this connection, when the rear wheels RR and RL skid, the drive power controller 1 first operates the traction control system, and thereafter operates the torque splitting control system, and thereby the rear wheels RR and RL are prevented from skidding.

Figure 2:
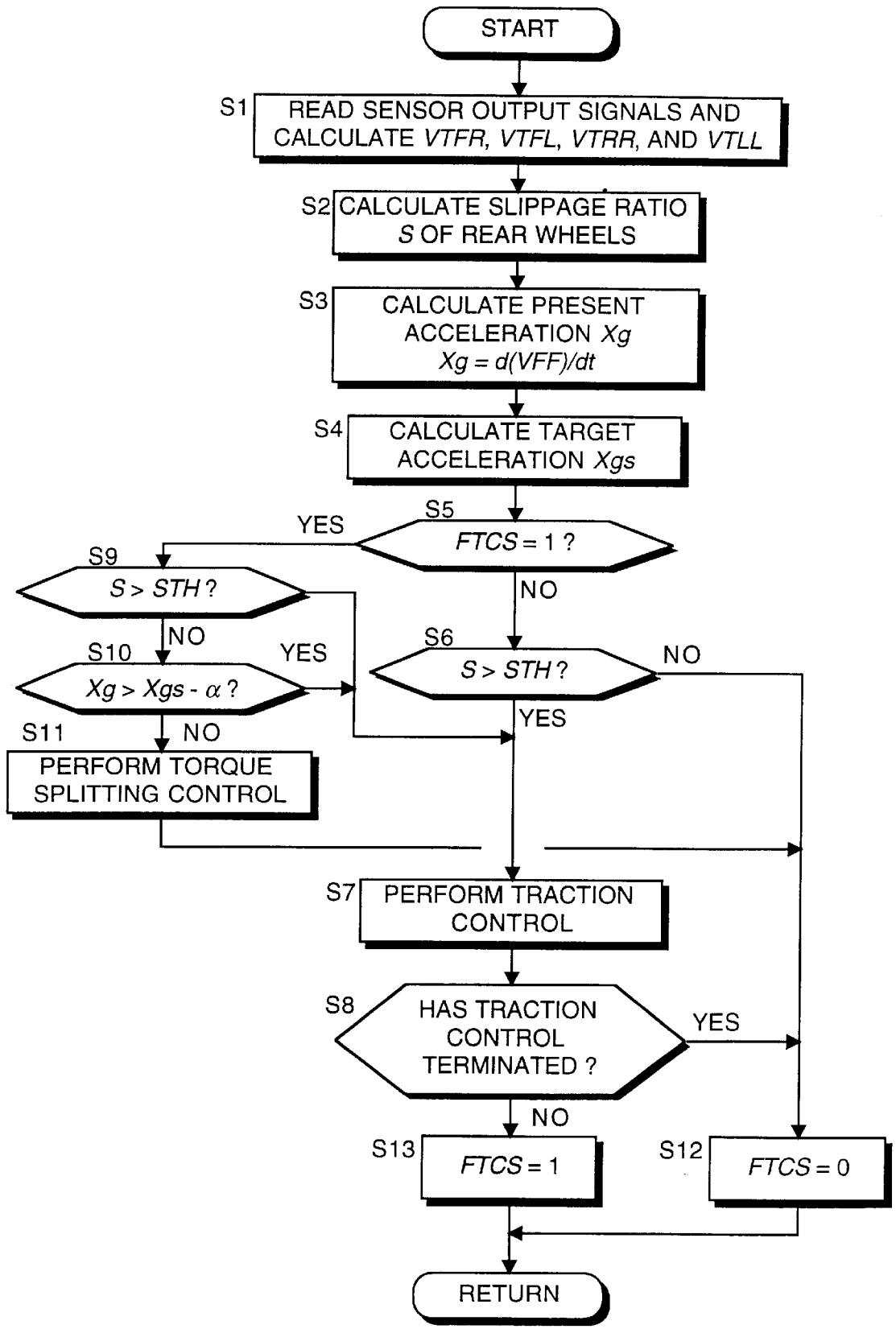
FIG. 2 is a flow chart for explanation of the order in which this drive power control device executes traction control and torque splitting control.

The flow chart of FIG. 2 shows a routine which the drive power controller 1 executes in order to do this. This process is executed repeatedly at a fixed interval.

In a step SI, the output signals from the wheel speed sensors 12FR, 12FL, 12RR, and 12RL are read in, and the wheel speeds VTFR, VTFL, VTRR, and VTRL are calculated.

In a step S2, the slippage ratio S of the rear wheels RR and RL, which are the principal drive wheels, is calculated using the following equation:

$$S=(VTFR+VTFL-VTRR-VTRL)/2 \quad (1)$$

In a step S3, the present acceleration Xg is calculated from the following equation:

$$Xgs=d(VFF)/dt \quad (2)$$

where, $$VFF=(VTFR+VTFL)/2$$

In a step S4, a target acceleration Xgs, which is a maximum value for the vehicle acceleration in the current vehicle operating conditions, is calculated from the following equation:

$$Xgs=1/K \cdot T_E \quad (3)$$

where, K is a constant which is determined according to the gear position of the transmission and the dynamic characteristics of the vehicle, and TE is the torque generated by the engine.

In a step S5, a decision is made, according to a flag FTCS for that purpose, as to whether or not the traction control system is operating.

If FTCS=0, in other words the traction control system is not operating, then the flow of control proceeds to a step S6, in which it is decided whether or not the slippage ratio S which was calculated in the step S2 is greater than a threshold value STH.

If the slippage ratio S is determined to be greater than this threshold value STH, then the flow of control proceeds to a step S7, in which control of drive power is performed via the traction control system.

Next in a step S8 a decision is made as to whether or not the drive power control via the traction control system has been terminated.

If in the step S6 it is determined that the slippage ratio S is equal to or less than the threshold value STH, or in the step S8 it is determined that the drive power control via the traction control system has been terminated, then the flow of control proceeds to a step S12, in which the flag FTCS is cleared.

If the drive power control via the traction control system has not been terminated, then in a step S13 the flag FTCS is set to 1.

Further, if in the step S5 it is determined that the flag FTCS is 1, in other words that the traction control system is in operation, then the flow of control proceeds to a step S9, and a decision is made as to whether or not the slippage ratio S which was calculated in the step S2 is greater than the threshold value STH.

If the slippage ratio S is determined to be greater than this threshold value STH, then the flow of control is transferred to the step S7, and control of drive power is performed via the traction control system.

If the slippage ratio S is determined to be equal to or less than this threshold value STH, then the flow of control proceeds to a step S10, and a decision is made as to whether or not the present acceleration Xg is greater than the target value for this acceleration Xgs with a predetermined value $\alpha$ subtracted therefrom.

If it is determined that Xg>Xgs-$\alpha$, then the flow of control is transferred to the step S7, and control of drive power is performed via the drive control system.

On the other hand, if it is determined that Xg$\leq$Xgs-$\alpha$, then the flow of control proceeds to a step S11. Here, control of the drive power is performed by the torque splitting control system so as continuously to change the apportionment of the transmitted torque between the front wheels FL and FR and the rear wheels RL and RR from 0:100 to 50:50.

After this procedure the flow of control proceeds to the step S12 in which the flag FTCS is cleared, and then this routine terminates.

According to the process described above, if the rear wheels RR and RL which are principal drive wheels skid, then first the traction control system is operated and the drive power to the rear wheels RL and RR is temporarily reduced, so as to restrain the skidding of the rear wheels RR and RL.

As shown in the step S9, the torque splitting control system operates after the slippage ratio S drops below the predetermined threshold value.

Accordingly, even if the coefficient of friction $\mu$ of the road surface is low such as on a road bearing an accumulation of snow, first the traction control is executed, and the torque splitting control is only executed after the slippage ratio S has dropped. Due to this, the inconvenience does not occur that delay of the application of traction control may encourage the rear wheels RR and RL to skid.

Further, since the start of the operation of traction control is limited to the case in which the present vehicle acceleration Xg is less than the target acceleration Xgs determined according to the vehicle operational conditions with the predetermined value $\alpha$ subtracted therefrom, thereby hunting of the torque apportionment between the front wheels and the rear wheels is prevented, and the starting off and acceleration performance of the vehicle are enhanced.

The embodiments of this invention in which an exclusive property or privilege is claimed are defined as follows. The corresponding structures, materials, acts, and equivalents of all means plus function elements in the claims below are intended to include any structure, material, or acts for performing the functions in combination with other claimed elements as specifically claimed.

I claim:

1. A drive power control device for a four wheel drive vehicle which comprises principal drive wheels and auxiliary drive wheels, comprising:

a sensor for detecting slippage of a principal drive wheel;

a traction control system which reduces the drive power to said principal drive wheels;

a torque splitting control system which increases the proportion of drive power apportioned to said auxiliary drive wheels; and a microprocessor programmed to:

start said traction control system upon detection of slippage by said sensor; and prevent said torque splitting control system from operating until said slippage is suppressed to a predetermined state after the start of said traction control system.

2. A drive power control device according to claim 1, wherein said microprocessor is further programmed to determine whether or not to start said torque splitting control system, when the slippage has been suppressed to the predetermined state.

3. A drive power control device according to claim 2, further comprising a sensor which detects the actual forward acceleration Xg of the vehicle, and wherein said microprocessor is further programmed so as to calculate a target acceleration Xgs for said vehicle, and to operate said traction control system if the acceleration Xg has dropped below said target acceleration Xgs with a predetermined value $\alpha$ subtracted therefrom.

4. A drive power control device according to claim 3, wherein said sensor which detects the acceleration Xg comprises a sensor which detects the rotational speed of said auxiliary drive wheels, and a microprocessor which is programmed to calculate the acceleration Xg based upon the change of rotational speed of said auxiliary drive wheels.

5. drive power control device according to claim 1, wherein said slippage detection sensor comprises a sensor which detects the rotational speed of said principal drive wheels, a sensor which detects the rotational speed of said auxiliary drive wheels, and a microprocessor programmed to calculate a principal drive wheel slippage ratio based upon the difference in rotational speed between said principal drive wheels and said auxiliary drive wheels.

6. A drive power control device for a four wheel drive vehicle which comprises principal drive wheels and auxiliary drive wheels, comprising:

means for detecting slippage of a principal drive wheel;

a traction control system which reduces the drive power to said principal drive wheels;

a torque splitting control system which increases the proportion of drive power apportioned to said auxiliary drive wheels; and means for starting said traction control system upon detection of slippage; and means for preventing said torque splitting control system from operating until said slippage is suppressed to a predetermined state after the start of said traction control system.

* * * * *